Oct. 13, 1936. J. L. REILLY Re. 20,131

DRILL STEEL GUIDE

Original Filed Dec. 22, 1933

Inventor:
John L. Reilly.
by
Louis A. Urban
Atty.

Reissued Oct. 13, 1936

Re. 20,131

UNITED STATES PATENT OFFICE 20,131

DRILL STEEL GUIDE

John L. Reilly, Claremont, N. H., assignor to Sullivan Machinery Company, a corporation of Massachusetts Original No. 2,026,062, dated December 31, 1935, Serial No. 703,577, December 22, 1933. Application for reissue March 11, 1936, Serial No. 68,301

12 Claims. (Cl. 308—4)

This invention relates to guides for drilling implements, and more particularly to a guide for drill steels used in hammer rock drills for cutting away the rock partitions between adjacent drill holes.

A common method of quarrying stone in blocks is by line drilling and broaching, a process in which parallel holes are drilled in spaced relation to each other—preferably separated by materially less than their diameters—and then connected by broaching out the stone between them sufficiently to form a complete channel. This broaching operation can be performed by a common type of drill steel if the bit be adequately guided during spotting and also during the removal of the web or partition of stone, but prior to my invention, so far as I am advised, no simple, compact and adequate device for accomplishing these functions has been available.

An object of this invention is to provide an improved guide for rock cutting implements. Another object is to provide an improved broaching guide for the drill steel of a hammer rock drill. A further object is to provide an improved guide for the drill steel of a hammer rock drill for guiding the steel during the cutting away of the rock partitions between adjacent drill holes during a broaching operation. Still another object is to provide an improved guide for the bit of a rock drill steel which will locate the bit during spotting and guide and position the bit during the further operations of cutting away the relatively thin walls or partitions of rock which separate adjacent holes drilled as the first step of severing a block of rock from its native mass. Yet another object is to provide an improved broaching apparatus. These and other objects will, however, hereinafter more fully appear in the course of the following description, and as more particularly pointed out in the appended claims.

In a preferred embodiment, from one aspect, my invention may comprise spaced, connected guide portions adapted to enter and move down adjacent parallel holes and to guide between them and maintain with its axis substantially in the plane of the axis of said holes a drill bit, said guide portions providing guiding of the bit during spotting and also throughout the full operation of cutting out the entire web between adjacent holes. Preferably the bit will be guided in a manner which will allow relative longitudinal movement between it and the guide, for in spotting the guide needs to extend in advance of the forward end of the bit, and in completing the cut the forward end of the bit should be free to advance at least to the forward ends of the guides.

From another aspect my invention comprises an improved broaching apparatus including a usual form of drill bit, guiding means as above set forth, and bit actuating means.

In the accompanying drawing there is shown for purposes of illustration one form which the invention may assume in practice.

In this drawing,—

Figure 1:
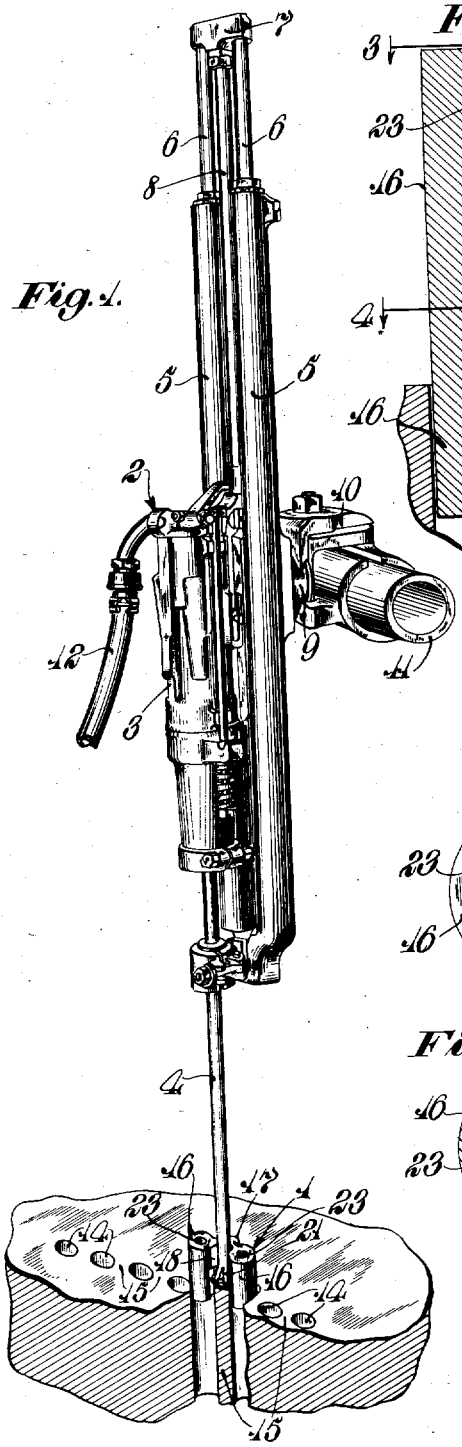
Fig. 1 is an elevational view of a broaching type hammer rock drill mounted in drilling position and having associated therewith the improved drill steel guide.

In this illustrative construction the improved drill steel guide generally designated 1 is shown associated with a hammer rock drill generally designated 2. The rock drill is herein of the mounted type and generally comprises a pressure fluid actuated hammer motor 3 for precussively actuating a usual rock drill steel 4. The hammer motor 3 is guided on parallel feed cylinders 5, 5 of a pneumatic feeding motor herein having projecting piston rods 6 connected by a transverse member 7 in turn connected by a rod 8 to the rear end of the hammer motor. The feed cylinders are supported on a swivel trunnion 9 in turn mounted within a clamp 10 secured to a horizontal support 11. Pressure fluid is supplied to the hammer and feed motors through a usual hose connection 12 and through the drill steel 4, which herein is made hollow at 13, to the bottom of the drill hole to blow away the cuttings from the hole. As the rock drill disclosed herein is of a standard design and does not per se enter into this invention, further description of the detail structure of the same is herein deemed unnecessary.

As above explained, in drilling in accordance with the broaching method in quarries with a rock drill of the type disclosed a series of closely adjacent holes 14 are drilled in line in the rock, the holes being separated by relatively thin walls or partitions 15, sometimes termed cores. After the holes are drilled these walls or partitions are drilled or broken away thereby to form a narrow elongated slot in the rock. I have provided an improved guide for guiding the drill steel 4 in the desired path during the drilling or breaking away of these hole-separating walls or partitions, and the improved guide herein comprises a frame having cylindrical guide portions 16, 16 arranged in parallel side by side relation and substantially fitting two adjacent holes 14 and having an intermediate connecting frame portion 17 herein arcuately formed to closely embrace the drill steel 4 and forming the inner portion of a lateral or open-sided slot 18 whereby the guide may be placed laterally in position with respect to the drill steel. The internal faces of the depending portions of the cylindrical guides 16, 16 are slotted at 19 to form a central guide opening 20 for receiving the cutting bit 21 of the drill steel 4, the outer surfaces of the wings 22 of the cutting bit being guided within the slots 19, thereby to maintain the drill steel centered between the cylindrical guide portions 16, 16. The transverse frame portion 17, that is, the U-shaped part of the guide frame which closely embraces the steel also provides means engageable with the cutting bit so when the steel is withdrawn from the drill hole the last means engages the bit to move the guide with the steel, the guide being hung on and supported by the steel during such withdrawal. Each of the guide portions 16, 16 is provided with a longitudinal bore 23 so that as the fluid flows through the bore 13 in the drill steel to the bottom of the drill hole, the cuttings may be blown from the hole past the guide through the openings 23, 23. The cylindrical guide portions 16, 16 substantially fitting the adjacent drill holes 14, 14 provide a substantial bearing surface for the drill steel and the guide, as the drill steel is fed inwardly, and will maintain the steel in coaxial alinement with the rock drill and midway between the adjacent drill holes both during spotting and also thereafter during drilling so that the cutting bit of the steel will be fed in a straight path thereby to effectively break away the separating wall or partition between the adjacent drill holes.

Figure 2:
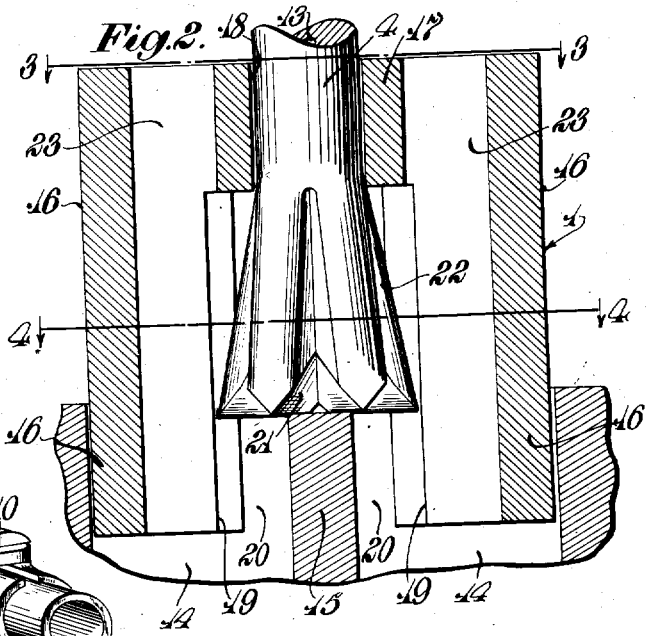
Fig. 2 is a vertical sectional view showing the illustrative form of the improved guide.
Figure 3:
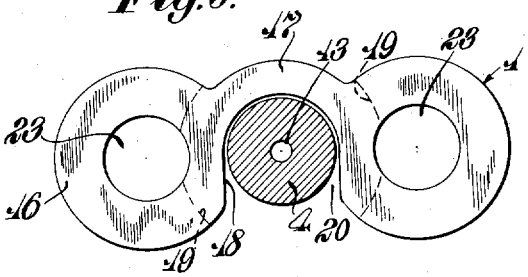
Fig. 3 is a cross sectional view taken on line 3—3 of Fig. 2.
Figure 4:
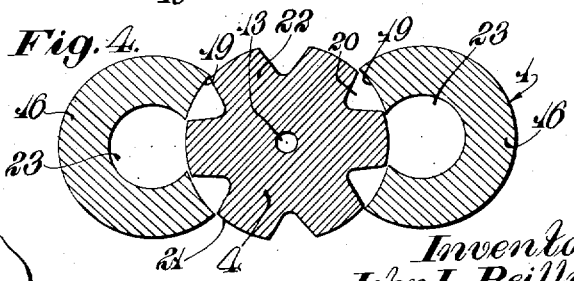
Fig. 4 is a cross sectional view taken on line 4—4 of Fig. 2.

It will be observed that in this preferred embodiment, which is adapted to use with lugged or collared steels having integral bits, there are provided spaced guides adapted to enter spaced holes, means for maintaining said guides in appropriately spaced relation, and means for maintaining the bit of a drill steel with its axis in the same plane with the axes of the guide (and thereby in the same plane with the axes of the holes to be connected). It will be observed, by noting Figs. 1, 2, and 4 that this relation is effectively maintained during the "spotting" operation (the beginning of the cut); and since the bit will be freely movable downwardly, as the stone is cut away, from the relative position to the guides shown in Fig. 1 to a position in which the bottom of the bit is in the same plane with the bottoms of the guides, when the bottom of said guides reach the bottoms of the holes 14, 14, obviously the guiding means will be effective to guide the entire broaching operation.

As a further result of this invention, it will be noted that an improved drill steel guide is provided which may be readily attached in guiding position with respect to a drill steel and having a plurality of cylindrical guiding portions fitting two adjacent holes whereby a substantial bearing surface is provided to maintain the drill steel in the desired path. It will further be noted that the improved guide is of an extremely simple and rugged design, which may be manufactured at a minimum of expense and applied to a rock drill steel of a standard design. These and other uses and advantages of the improved guide will be clearly apparent to those skilled in the art.

While there is in this application specifically described one form which the invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. A drill steel guide comprising cylindrical guide portions arranged in parallel relation for slidingly guiding the enlarged cutting end of a drill steel interposed therebetween, and an intermediate yoke-shaped connecting frame extending between said guide portions and embracing the drill steel shank, said connecting frame formed to hang on the enlarged cutting end of the steel guided by and between said guide portions and said connecting frame being formed with an open side to permit lateral sidewise removal of the guide from the drill steel shank.

2. A drill steel guide comprising cylindrical guide portions arranged in parallel relation for slidingly guiding the enlarged cutting end of a drill steel interposed therebetween, and an intermediate yoke-shaped connecting frame extending between said guiding portions and embracing the drill steel shank, said connecting frame formed to hang on the enlarged cutting end of the steel guided by and between said guide portions and said connecting frame being formed with an open side to permit lateral sidewise removal of the guide from the drill steel shank, said guide portions having openings extending therethrough for discharging the cuttings from the hole drilled by the drill steel.

3. A guiding tool for use in a boring operation, comprising cylindrical guide portions arranged in parallel side by side relation in a manner to be positioned in parallel bored holes, and a yoke extension formed integral with and extending between said cylindrical guide portions for engaging the shank of a reciprocating hammer drill steel arranged between said cylindrical guide portions and used in boring an adjacent overlapping hole intermediate said parallel holes for cutting the separating core between said parallel bored holes, said yoke being open at one side whereby the drill steel and tool are used together without passing the drill steel in an endwise direction through the tool, and permitting lateral sidewise removal of the tool from the drill steel shank.

4. A guiding tool for use in a boring operation, comprising cylindrical guide portions arranged in parallel side by side relation in a manner to be positioned in parallel bored holes, and a yoke extension formed integral with and extending between said cylindrical guide portions for engaging the shank of a reciprocating hammer drill steel arranged between said cylindrical guide portions and used in boring an adjacent overlapping hole intermediate said parallel holes for cutting the separating core between said parallel bored holes, said yoke being open at one side whereby the drill steel and tool are used together without passing the drill steel in an endwise direction through the tool and permitting lateral sidewise removal of the tool from the drill steel shank, said cylindrical guide portions having openings extending therethrough for discharging the cuttings from the hole drilled by the drill steel.

5. A guiding tool for use in a boring operation, comprising cylindrical guide portions arranged in parallel side by side relation in a manner to be positioned in parallel bored holes, and a yoke extension formed integral with and extending between said cylindrical guide portions for engaging the shank of a reciprocating rock drill steel for guiding the cutting end of the steel arranged between said cylindrical guide portions and used in boring an adjacent overlapping hole intermediate said parallel holes, said yoke extension being open at one side whereby the drill steel and tool are used together without passing the drill steel in an endwise direction through the guiding tool and permitting lateral sidewise removal of the tool from the shank, said parallel guide portions having formed on their adjacent inner sides longitudinal guideways in which the cutting end of the drill steel is slidably guided.

6. A guiding tool for use in a boring operation, comprising cylindrical guide portions arranged in parallel side by side relation in a manner to be positioned in parallel bored holes, and a yoke extension formed integral with and extending between said cylindrical guide portions for engaging the shank of a reciprocating rock drill steel for guiding the cutting end of the drill steel arranged therebetween and used in boring an adjacent overlapping hole intermediate said parallel holes for cutting the separating core between said parallel bored holes, said yoke extension being formed to hang on the cutting end of the steel during withdrawal of the steel from the bore hole and provided with an open side so that the tool may be placed laterally sidewise on the drill steel shank without passing the drill steel in an endwise direction through the guiding tool, said guide portions when in guiding relation with the cutting end of the steel co-operating with said cutting end for locking the guiding tool against sidewise removal from the drill steel, said guiding tool being releasable from said locking relationship by rearward movement of the guiding tool along the steel shank and when in its unlocked position being removable as aforesaid laterally from the steel shank.

7. A drill steel guide comprising cylindrical guide portions arranged in parallel relation for slidingly guiding the cutting end of a drill steel, and an intermediate yoke-shaped connecting frame extending between said guide portions and embracing the steel shank, said connecting frame formed to hang on the cutting end of the steel arranged therebetween and guided by said guide portions and said connecting frame being formed to permit lateral sidewise removal of the guide from the drill steel shank and said guide portions cooperating with the cutting end of the steel to lock the guide against lateral removal from the steel when said guide is in guiding relation with respect thereto.

8. A drill steel guide comprising guide portions arranged in parallel relation and spaced to enable them to enter and be guided in a pair of parallel holes, and means for rigidly connecting said guide portions and maintaining them in such spaced relation, said means of a size to pass down into the space provided as broaching progresses and entering such space as said guide portions travel down said holes, said guide providing means for maintaining the cutting end of a drill bit with its axis in the same plane with the axis of the parallel holes and said guide portions extending forwardly in advance of the forward (cutting) end of the bit when said guide is in its foremost relative position with respect to the bit, whereby the bit is located and held in proper position by said guide during the spotting operation.

9. In an apparatus for broaching out the cores or webs separating parallel holes, means for guiding a drill bit during the starting of the broaching operation and throughout the same including elongated guides positioned to enter such holes, means for connecting said guides, said means of a size to pass down into the space provided as broaching progresses and entering such space as said guides travel down said holes, and means for centering the bit in a position between the top and bottom of said guides and with its axis in the same plane with the axes of said guides.

10. A drill steel guide comprising guide portions arranged in parallel relation and spaced to enable them to enter and be guided by a pair of parallel holes, and means for rigidly connecting said guide portions and maintaining them in spaced relation, said means of a size to pass down into the space provided as broaching progresses and entering such space as said guide portions travel down said holes, said guide having at a point thereon to the rear of the forward ends of said guide portions means for centering a drilling implement both midway between said guides and between parallel planes tangent to said holes at the sides of the latter, whereby said guide may locate said implement during a spotting operation.

11. An attachment for use in the operation of broaching the "cores" between adjacent parallel holes in stone or similar material and for positioning a cutting implement during the starting of the broaching operation and guiding it throughout such operation, including a pair of parallel guides each adapted to enter and pass down one of a pair of adjacent parallel holes, means for connecting said guides rigidly together adapted to pass downward through the broached connection to be formed between the holes, and means for guiding a broaching bit providing for relative longitudinal movement between the same and said parallel guides between positions in which said bit has its forward end in the same transverse plane with the forward ends of said guides and in a transverse plane substantially to the rear of said ends whereby said ends may enter parallel holes and locate the bit during spotting, said guiding means arranged to center the bit axis both laterally and transversely with respect to said guides.

12. Apparatus for broaching out "cores" between adjacent parallel holes in stone including a drill bit adapted to form a round hole of a diameter greater than the distance between the adjacent edges of said holes, means for actuating said bit, and means for positioning said bit during starting of the cutting away of a core and thereafter until such operation is completed at the bottom of the holes, including guiding means positioned to enter and pass down parallel holes, means for rigidly connecting said guiding means, and means for centering the bit with its axis in the same plane with the axes of the holes and also midway between the axes of the holes, in a position in which said bit is to the rear of the forward ends of said guides.

JOHN L. REILLY.